(12) United States Patent
Nishiguchi et al.

(10) Patent No.: US 6,761,973 B2
(45) Date of Patent: Jul. 13, 2004

(54) CATIONIC RESIN COMPOSITION

(75) Inventors: Shigeo Nishiguchi, Hiratsuka (JP); Koji Kamikado, Yokohama (JP); Souichi Ikejiri, Hiratsuka (JP); Hideki Iijima, Shiroyama-machi (JP)

(73) Assignee: Kansai Paint Co., Ltd., Hyogo-ken (JP)

( * ) Notice: Subject to any disclaimer, the term of this patent is extended or adjusted under 35 U.S.C. 154(b) by 12 days.

(21) Appl. No.: 10/234,315

(22) Filed: Sep. 5, 2002

(65) Prior Publication Data

US 2003/0158348 A1 Aug. 21, 2003

(30) Foreign Application Priority Data

Sep. 17, 2001 (JP) ........................................ 2001-280873

(51) Int. Cl.[7] .............................................. B32B 15/08
(52) U.S. Cl. ...................... 428/418; 204/504; 204/505; 204/506; 523/403; 523/409; 523/420; 523/423; 528/45
(58) Field of Search ................................. 204/489, 504, 204/505, 506; 523/403, 409, 420, 423; 528/45; 428/418

(56) References Cited

U.S. PATENT DOCUMENTS 4,278,580 A * 7/1981 Schmolzer .................. 525/507
5,451,305 A * 9/1995 Ott .............................. 523/402

* cited by examiner

Primary Examiner—Philip Tucker
Assistant Examiner—D. Aylward
(74) Attorney, Agent, or Firm—Wenderoth, Lind & Ponack, LLP

(57) ABSTRACT

The present invention provides a cationic resin composition comprising a cationic resin (A) and a blocked polyisocyanate (B) obtained by reacting an active hydrogen-containing component comprising a diol (a) which has two hydroxyl groups having different reactivities from each other and which has a molecular weight of 76 to 150 and a carboxyl group-containing diol (b) having a molecular weight of 106 to 500 with a polyisocyanate compound (c).

19 Claims, No Drawings

CATIONIC RESIN COMPOSITION

The present invention relates to a cationic resin composition, more specifically to a cationic resin composition which comprises a cationic resin and polyisocyanate blocked with a blocking agent containing a specific diol and which can form a coating film excellent in a corrosion resistance and a curing property and particularly to a cationically electrodepositable coating material.

A coating material comprising a resinous vehicle having a cationic group such as an amino group, an ammonium group, a phosphonium group and a sulfonium group or a neutralized cationic group thereof and blocked polyisocyanate which is a blocking agent has so far been available as a cationic resin composition comprising blocked polyisocyanate. To be typical, capable of being given is a cationically electrodepositable coating material comprising a resinous vehicle having a neutralized cationic group and blocked polyisocyanate.

In a cationically electrodepositable coating material, ether alcohol base compounds have so far been used as a blocked polyisocyanate compound in many cases in terms of a corrosion resistance of a coating film and a coating material stability. However, a coating film of a cationic coating material comprising polyisocyanate blocked with an ether alcohol base compound has the defects that it has a lot of a heat loss (a loss proportion in baking and curing a coating film) and that tar and soot are produced in large quantities in a drying oven of a coating line. Further, a curing property of a coating material at a low temperature has been desired in order to lower a baking temperature at a drying step in a coating line from a viewpoint of energy saving. In recent years, a cationic coating material comprising polyisocyanate blocked with an oxime base compound is used in many cases as a composition satisfying these requirements. However, a cationic coating material comprising polyisocyanate blocked with an oxime base compound as a blocking agent has problems on stability with the passage of time and a corrosion resistance of a coating film.

An object of the present invention is to provide a cationic resin composition which has a good coating material stability and corrosion resistance and which is excellent in a low heat loss and a curing property at a low temperature.

Intensive investigations made by the present inventors have resulted in finding that the object described above can be achieved by using polyisocyanate blocked with a specific blocking agent as a cross-linking agent for a cationic resin composition, and they have come to complete the present invention.

Thus, according to the present invention, provided is a cationic resin composition comprising:

(A) a cationic resin
and
(B) a blocked polyisocyanate obtained by reacting an active hydrogen-containing component comprising a diol (a) which has two hydroxyl groups having different reactivities from each other and which has a molecular weight of 76 to 150 and a carboxyl group-containing diol (b) having a molecular weight of 106 to 500 with a polyisocyanate compound (c).

Further, according to the present invention, provided is a cationically electrodepositable coating method characterized by using the cationic resin composition described above.

The present invention shall be explained below in further details.

The cationic resin composition of the present invention comprises the cationic resin (A) and the blocked polyisocyanate (B) obtained by reacting the active hydrogen-containing component comprising the specific diol components with the polyisocyanate compound as the essential components.

Cationic Resin (A)

In the resin composition of the present invention, the cationic resin (A) used as a resinous vehicle is a resin having a cationic group which can be ionized when dispersed in water to make the above resin water-soluble or water-dispersible and a functional group (for example, a hydroxyl group, a primary amino group and the like) which reacts with an isocyanato group. To be specific, included are, for example, resins having a cationic group such as an amino group, an ammonium salt group, a sulfonium salt group and a phosphonium salt group and a hydroxyl group. The resin kind of such cationic resin (A) includes, for example, resins of an epoxy base, an acryl base, a polybutadiene base, an alkyd base and a polyester base. In particular, an amine-added epoxy resin obtained by subjecting a polyepoxide compound to addition reaction with amine is suited as the cationic resin (A).

Capable of being given as the amine-added epoxy resin described above are, for example, (1) an adduct of a polyepoxide compound to primary mono- or polyamine, secondary mono- or polyamine or primary and secondary mixed polyamine (refer to, for example, U.S. Pat. No. 3,984,299); (2) an adduct of a polyepoxide compound to secondary mono- or polyamine having a primary amino group which is reduced to ketimine (refer to, for example, U.S. Pat. No. 4,017,438); and (3) a reaction product obtained by etherifying a polyepoxide compound with a hydroxy compound having a primary amino group which is reduced to ketimine (refer to, for example, Japanese Patent Application Laid-Open No. 43013/1984).

The polyepoxide compound used for producing the amine-added epoxy resin described above is a compound having 1.5 or more, preferably 2 or more epoxy groups on average in a molecule and is suitably a compound having a number average molecular weight falling in a range of usually at least 200, preferably 400 to 4000 and more preferably 800 to 2500 and an epoxy equivalent falling in a range of at least 160, preferably 180 to 2500 and more preferably 400 to 1500. In particular, preferred is a compound obtained by reacting a polyphenol compound with epichlorohydrin. Capable of being given as the polyphenol compound which can be used for forming the above polyepoxide compound are, for example, bis(4-hydroxyphenyl)-2,2-propane, 4,4'-dihydroxybenzophenone, bis(4-hydroxyphenyl)-1,1-ethane, bis(4-hydroxyphenyl)-1,1-isobutane, bis(4-hydroxy-tert-butyl-phenyl)-2,2-propane, bis(2-hydroxynaphthyl)methane, tetra(4-hydroxyphenyl)-1,1,2,2-ethane, 4,4'-dihydroxydiphenylsulfone, phenol novolak and cresol novolak.

The above polyepoxide compound may be those reacted partly with polyols, polyetherpolyols, polyesterpolyols, polyamideamines, polycarboxylic acids and polyisocyanate compounds. Further, it may be those which are graft-polymerized with caprolactones such as ε-caprolactone and acryl monomers.

Capable of being given as the primary mono- or polyamine, secondary mono- or polyamine or primary and secondary mixed polyamine used for producing the amine-added epoxy resin of (1) described above are, for example, mono- or di-alkylamines such as monomethylamine, dimethylamine, monoethylamine, diethylamine, monoisopropylamine, diisopropylamine, monobutylamine and dibutylamine; alkanolamines such as monoethanolamine, diethanolamine, mono(2-hydroxypropyl)amine and monomethylaminoethanol; and alkylenepolyamines such as ethylenediamine, propylenediamine, butylenediamine, hexamethylenediamine, diethylenetrimine and triethyleneteteramine.

Among the primary mono- or polyamines, secondary mono- or polyamines or primary and secondary mixed polyamines used for producing the amine-added epoxy resin of (1) described above, ketimine compounds obtained by reacting ketone compounds with compounds having a primary amino group (for example, monomethylamine, monomethanolamine, ethylenediamine and diethylenetriamine) can be given as the secondary mono- or polyamine having a primary amino group reduced to ketimine which is used for producing the amine-added epoxy resin of (2) described above.

Among the primary mono- or polyamines, secondary mono- or polyamines or primary and secondary mixed polyamines used for producing the amine-added epoxy resin of (1) described above, hydroxyl group-containing ketimine compounds obtained by reacting ketone compounds with compounds having a primary amino group and a hydroxyl group (for example, monoethanolamine, mono(2-hydroxypropyl)amine and the like) can be given as the hydroxy compound having a primary amino group reduced to ketimine which is used for producing the amine-added epoxy resin of (3) described above.

Further, capable of being given as the amine-added epoxy resin described above are polyol-modified amine-added epoxy resins obtained by reacting the polyepoxide compounds described above, preferably the polyepoxide compounds having an epoxy equivalent of 180 to 2500 with polyol compounds obtained by adding caprolactone to compounds having two or more active hydrogen-containing groups in a molecule and amino group-containing compounds, and they can suitably be used.

The compound having two or more active hydrogen-containing groups in a molecule is preferably a compound having a molecular weight falling in a range of 62 to 5,000 and containing 2 to 30 active hydrogen-containing groups in a molecule, and a hydroxyl group, a primary amino group and a secondary amino group can be given as the above active hydrogen-containing group.

Capable of being given as the compound having two or more active hydrogen-containing groups in a molecule are, for example, low molecular weight polyols such as ethylene glycol, propylene glycol, 1,3-butylene glycol, 1,4-butanediol, 1,6-hexanediol, diethylene glycol, dipropylene glycol, neopentyl glycol, glycerin, trimethylolpropane and pentaerythritol; linear or branched polyetherpolyols such as polyethylene glycol, polypropylene glycol, polytetramethylene glycol and bisphenol A polyethylene glycol ether; polyesterpolyols obtained by subjecting organic diols such as the low molecular weight polyols described above to polycondensation reaction with organic dicarboxylic acids such as succinic acid, adipic acid, azelaic acid, sebacic acid, maleic acid, cyclohexanedicarboxylic acid, phthalic acid, isophthalic acid and terephthalic acid or anhydrides thereof under a condition of an excess of the organic diols; amine compounds such as butylenediamine, hexamethylenediamine, tetraethylenepentamine, pentaethylenehexamine, monoethanolamine, diethanolamine, triethanolamine, mono(2-hydroxypropyl)amine, di(2-hydroxypropyl)amine, 1,3-bisaminomethylcyclohexanone, isophoronediamine, xylilenediamine, metaxylilenediamine, diaminodiphenylmethane, phenylenediamine, ethylenediamine, propylenediamine, diethylenetriamine and triethylenetetramine; polyamides derived from piperazine and these amine compounds, polyamideamines, amine adducts with epoxy compounds, ketimenes and aldimines.

Caprolactone which is subjected to addition reaction with the foregoing compounds having two or more active hydrogen-containing groups in a molecule includes γ-caprolactone, ε-caprolactone and δ-caprolactone, and ε-caprolactone is particularly suited.

Addition reaction of caprolactone with the foregoing compounds having two or more active hydrogen-containing groups in a molecule can be carried out by conventionally known methods, and polyol compounds can be obtained by this addition reaction.

The amino group-containing compound used for producing the polyol-modified amine-added epoxy resin described above is a cationic group-providing component for introducing an amino group into the resin to make the resin cationic, and the compound having at least one active hydrogen which reacts with an epoxy group can be used. Capable of being given as the specific examples thereof are, for example, compounds capable of being used for the primary mono- or polyamines, secondary mono- or polyamines or primary and secondary mixed polyamines used for producing the amine-added epoxy resin of (1) described above; the secondary mono- or polyamines having a primary amino group reduced to ketimine which are used for producing the amine-added epoxy resin of (2) described above; and the hydroxy compounds having a primary amino group reduced to ketimine which are used for producing the amine-added epoxy resin of (3) described above.

The cationic resin (A) has usually a number average molecular weight falling in a range of 700 to 6000, particularly 1000 to 4000 and has preferably a cationic group in an amount of an equivalent falling in a range of 0.5 to 3 equivalent, particularly 0.7 to 2 equivalent per kg of the resin.

Further, when the cationic resin (A) has an amino group as a cationic group, it can be solubilized or dispersed in water by neutralizing with an acid including organic carboxylic acids such as formic acid, acetic acid, propionic acid and lactic acid and inorganic acids such as hydrochloric acid and sulfuric acid. When it has an onium group such as an ammonium salt group, a sulfonium salt group and a phosphonium salt group as a cationic group, it can be solubilized or dispersed in water as it is.

The cationic resin (A) may be used by solubilizing or dispersing in water or in the form of an organic solvent solution. The cationic resin (A) can be made cationically electrodepositable, if necessary, by neutralizing with an acid to dissolve or disperse in a water base medium and can suitably be used as a resinous vehicle component in a water base coating material such as a cationically electrodepositable coating material.

Blocked Polyisocyanate (B)

In the resin composition of the present invention, the blocked polyisocyanate (B) used as a cross-linking agent is obtained by reacting an active hydrogen-containing component comprising the diol (a) which has two hydroxyl groups having different reactivities from each other and which has a molecular weight of 76 to 150 and the carboxyl group-containing diol (b) having a molecular weight of 106 to 500 with the polyisocyanate compound (c). The polyisocyanate compound (c) is blocked with the above active hydrogen-containing component, and in the blocking reaction, partially causes high polymerization brought about by bonding of two polyisocyanate compounds (c) via the active hydrogen-containing component.

The blocked polyisocyanate compound (c) described above includes, for example, aromatic, aliphatic or alicyclic polyisocyanate compounds such as tolylenediisocyanate, xylilenediisocyanate, phenylenediisocyanate, bis(isocyanatomethyl)cyclohexane, tetramethylenediisocyanate, hexamethylenediisocyanate, methylenediisocyanate, isophoronediisocyanate, phenylenediisocyanate, diphenylmethane-2,4'-diisocyanate, diphenylmethane-4,4'-diisocyanate and polymethylenepolyphenylisocyanate; cyclized polymers and isocyanate biuret products of these polyisocyanate compounds; and terminal isocyanato group-containing compounds obtained by reacting excess amounts of these polyisocyanate compounds with low molecular active hydrogen-containing compounds such as ethylene glycol, trimethylolpropane, hexanetriol and castor oil. They may be used alone or in a mixture of two or more kinds thereof.

Among them, suited are particularly aromatic diisocyanates, especially diphenylmethane-2,4'-diisocyanate, diphenylmethane-4,4'-diisocyanate (usually called "MDI") and crude MDI. The crude MDI is a mixture comprising diphenylmethane-4,4'-diisocyanate, diphenylmethane-2,4'-diisocyanate and polymethylenepolyphenylpolyisocyanate as principal components, and capable of being given as commercial products thereof are CosmonateM-50, ditto M-200, ditto M-100 and ditto M-300 (all manufactured by Mitsui Takeda Chemicals, Inc.); Sumidur 44V10, ditto 44V20 and ditto 44V40 (all manufactured by Sumika Bayer Urethane Co., Ltd.); Lupranate M-12, ditto M-12S, ditto M-20 and ditto M-20S (all manufactured by BASF A.G.); and Mondur MR (LIGHT) (manufactured by Bayer Co., Ltd.).

The active hydrogen-containing component comprising the diol (a) and the carboxyl group-containing diol (b) which is reacted with the polyisocyanate compound (c) described above is added to an isocyanato group of the polyisocyanate compound (c) to block the polyisocyanate compound (c) and partially subject it to high polymerization. It is important that the blocked polyisocyanate produced by addition is stable at room temperature and that when heated at a temperature falling in a range of about 100 to about 200° C., it can dissociate the blocking agent to reproduce a free isocyanato group.

The diol (a) which is used as a part of the active hydrogen-containing component satisfying such requisites has two hydroxyl groups having different reactivities in a molecule, for example, two hydroxyl groups of a combination of a primary hydroxyl group and a secondary hydroxyl group, a primary hydroxyl group and a tertiary hydroxyl group and a secondary hydroxyl group and a tertiary hydroxyl group and has a molecular weight of 76 to 150. To be specific, capable of being given are, for example, propylene glycol, dipropylene glycol, 1,3-butanediol, 1,2-butanediol, 3-methyl-1,2-butanediol, 1,2-pentanediol, 1,4-pentanediol, 3-methyl-4,3-pentanediol, 3-methyl-4,5-pentanediol, 2,2,4-trimethyl-1,3-pentanediol, 1,5-hexanediol and 1,4-hexanediol. Among them, propylene glycol is suited from the viewpoints of a reactivity of the blocked polyisocyanate, a reduction in the heat loss and a storage stability of the coating material. In these diols (a), the hydroxyl group having a higher reactivity is reacted preferentially with an isocyanato group to block the isocyanato group.

The diol (b) which is used as a part of the active hydrogen-containing component satisfying the requisites described above is a carboxyl group-containing diol having one carboxyl group and two hydroxyl groups in a molecule and a molecular weight of 106 to 500, preferably 120 to 450. It has a carboxyl group in a molecule, whereby the dissociativeness at a low temperature can be elevated, and a curing property of the resin composition of the present invention at a low temperature can be enhanced. Particularly when an organotin compound is used as a curing catalyst, the curing property at a low temperature can be elevated to a large extent. Capable of being given as the carboxyl group-containing diol (b) are, for example, 2,2-dimethylolpropionic acid, 2,2-dimethylolbutanoic acid, dimethylolvaleric acid and glyceric acid. In particular, 2,2-dimethylolbutanoic acid is suited.

In the active hydrogen-containing component described above, the other blocking agent (d) can be used, if necessary, in combination in addition to the diol (a) and the carboxyl group-containing diol (b). The other blocking agent (d) which can be used in combination includes, for example, lactam compounds such as ε-caprolactam and γ-butyrolactam; oxime base compounds such as methyl ethyl ketoxime and cyclohexanone oxime; phenol base compounds such as phenol, para-t-butylphenol and cresol; aliphatic alcohols such as n-butanol and 2-ethylhexanol; aromatic alkylalcohols such as phenylcarbitol and methylphenylcarbitol; ether alcohol base compounds such as ethylene glycol monopropyl ether, ethylene glycol monobutyl ether and diethylene glycol monoethyl ether; and low molecular weight amide compounds such as N-methylacetamide, N-ethylacetamide, N-methylpropionamide and N-methylformamide. Among them, the lactam compounds, the ether alcohol base compounds and the low molecular weight amide compounds are suited from the viewpoints of a reactivity of the blocked polyisocyanate and a storage stability of the coating material.

In producing the blocked polyisocyanate (B), capable of being usually used is the active hydrogen-containing component comprising the diol (a) in such an amount that a hydroxyl group contained in the diol (a) accounts for 0.6 to 6 equivalent, preferably 0.7 to 5 equivalent and more preferably 0.8 to 4 equivalent per equivalent of an isocyanato group of the polyisocyanate compound (c), the diol (b) in such an amount that a hydroxyl group contained in the carboxyl group-containing diol (b) accounts for 0.005 to 0.6 equivalent, preferably 0.005 to 0.4 equivalent and more preferably 0.08 to 0.35 equivalent per equivalent of an isocyanato group of the polyisocyanate compound (c) and, if necessary, the other blocking agent (d). Further, the total equivalent of the hydroxyl groups contained in the diol (a) and the carboxyl group-containing diol (b) per equivalent of an isocyanato group of the polyisocyanate compound (c) is suitably 0.65 equivalent or more, preferably 0.7 to 5 equivalent and more preferably 0.75 to 4 equivalent, and the total equivalent of the whole active hydrogens contained in the active hydrogen-containing component is suitably 1.2 to 6.1 equivalent, preferably 1.2 to 5 equivalent and more preferably 1.2 to 4.5 equivalent from the viewpoints of a corrosion resistance of a coating film formed by using the resin composition of the present invention and a stability of the resin composition.

A blending proportion of the diol (a), the carboxyl group-containing diol (b) and the other blocking agent (d) in the active hydrogen-containing component falls preferably in a range of 10 to 95 mole %, particularly 15 to 90 mole % in the case of the diol (a), 0.5 to 50 mole %, particularly 0.5 to 30 mole % in the case of the carboxyl group-containing diol (b) and 0 to 65 mole %, particularly 5 to 60 mole % in the case of the other blocking agent (d) each based on the total amount of these three compounds.

In producing the blocked polyisocyanate (B), the polyisocyanate compound (c) can suitably be reacted with the carboxyl group-containing diol (b) and, if necessary, the other blocking agent (d) and then reacted with the diol (a). In this case, the total equivalent of the active hydrogens contained in the carboxyl group-containing diol (b) and the other blocking agent (d) falls suitably in a range of 0.01 to 0.7 per equivalent of an isocyanato group of the polyisocyanate compound (c). The polyisocyanate compound (c), the carboxyl group-containing diol (b) and the other blocking agent (d) are reacted in the quantitative proportion described above in which the isocyanato groups are excessive to obtain a compound having isocyanato groups at terminals, and then the diol (a) is reacted therewith in the quantitative range described above, whereby a reaction of a hydroxyl group having a lower reactivity contained in the diol (a) with an isocyanato group can be suppressed, and the resulting blocked polyisocyanate (B) can be inhibited from turning to a higher molecular weight, which results in making it possible to obtain a coating film having an excellent finish property.

Cationic Resin Composition

The cationic resin composition of the present invention comprises the cationic resin (A) and the blocked polyisocyanate (B) as the essential components and can contain, if necessary, coating additives such as an organotin compound, a color pigment, an extender pigment, a rust preventive pigment, an organic solvent, water, a neutralizing agent, a pigment dispersant and a coated face-controlling agent.

The organotin compound described above accelerates dissociation of the blocking agent from the blocked polyisocyanate (B) and the regenerated polyisocyate works as a curing agent, and capable of being given are, for example, organotin compounds such as dibutyltin oxide and dioctyltin oxide; and fatty acid or aromatic carboxylic acid salts of dialkyltin such as dibutyltin dilaurate, dioctyltin dilaurate, dibutyltin diacetate, dioctyltin dibenzoate and dibutyltin dibenzoate. Among them, dialkyltin aromatic carboxylic acid salts are suitable from a viewpoint of a low temperature curing property. A use amount of the organotin compound shall not strictly be restricted and can be changed in a wide range according to performances required to the resin composition. Usually, it falls suitably in a range of 0 to 8 parts by weight, preferably 0.05 to 5 parts by weight per 100 parts by weight of the resinous solid matters contained in the resin composition.

The resin composition of the present invention can be used as a coating material and may have a form of either an organic solvent type coating material or a water based coating material. It can suitably used in the form of a water based coating material, especially a cationically electrodepositable coating material from a viewpoint of protection of the earth environment.

When the resin composition of the present invention is used in the form of a cationically electrodepositable coating material, it can be coated on a desired substrate surface by electrodeposition coating. Electrodeposition coating can usually be carried out by diluting the resin composition with deionized water so that the solid matter concentration becomes about 5 to 40% by weight, controlling an electrodeposition bath comprising an electrodepositable coating material in which a pH is adjusted to a range of 5.5 to 9.0 to a bath temperature of usually 15 to 35° C. and applying an electric current on a condition of a loaded voltage of 100 to 400 V with a coated article being used as a cathode. A film thickness of the electrodeposited coating film shall not specifically be restricted and can fall in a range of 10 to 40 $\mu$m, preferably 15 to 30 $\mu$m based on the dried coating film. Further, a curing temperature of the coating film by baking falls suitably in a range of usually about 100 to about 200° C., preferably about 120 to about 160° C.

The resin composition of the present invention can suitably be used as a cationically electrodepositable coating material, but it shall not be restricted thereto and can also be used as a corrosion preventive primer for coating by a method such as spray coating and roll coating.

The cationic resin composition of the present invention can form a cured coating film which is excellent in a corrosion resistance, an electrodeposition coating aptitude to a rust preventive steel plate and an adhesive property to a substrate, and it is useful as an undercoating material in the fields of, for example, car bodies, car parts and construction and architecture.

The present invention shall more specifically be explained with reference to examples, but the scope of the present invention shall not be restricted only to these examples. Hereinafter, "%" shall mean "% by weight" and "part(s)" shall mean "part(s) by weight".

Production of Cationic Resin

PRODUCTION EXAMPLE 1

A reactor was charged with 400 parts of "PP-400" (brand name, manufactured by Sanyo Kasei Co., Ltd., polypropylene glycol, molecular weight: about 400) and 300 parts of ε-caprolactone and heated up to 130° C. Then, 0.01 part of tetrabutoxytitanium was added thereto, and the temperature was elevated to 170° C. Sampling was carried out with the passage of time while maintaining this temperature to trace an amount of unreacted ε-caprolactone by measurement of an infrared absorption spectrum, and when the reaction rate reached 98% or more, the reactor was cooled down to synthesize a modifier 1.

Next, another flask was charged with 1000 parts of "Epikote 828EL" (brand name, manufactured by Japan Epoxy Resin Co., Ltd., bisphenol A type epoxy resin, epoxy equivalent: about 190, molecular weight: about 350), 400 parts of bisphenol A and 0.2 part of dimethylbenzylamine, and they were reacted at 130° C. until the epoxy equivalent reached 750. Added thereto were 200 parts of the modifier 1 described above, 140 parts of diethanolamine and 65 parts of a diketimine product of diethylenetriamine and methylisobutyl lectone, and they were reacted at 120° C. for 4 hours. Then, 400 parts of ethylene glycol monobutyl ether was added thereto to obtain a cationic resin-1 solution having a resinous solid matter content of 80%. This resin had an amine value of 56 mg KOH/g.

PRODUCTION EXAMPLE 2

A reactor was charged with 1010 parts of "Epikote 828EL" (brand name, manufactured by Japan Epoxy Resin Co., Ltd., bisphenol A type epoxy resin, epoxy equivalent: about 190, molecular weight: about 350), 390 parts of bisphenol A and 0.2 part of dimethylbenzylamine, and they were reacted at 130° C. until the epoxy equivalent reached 800. Next, 260 parts of ε-caprolactone and 0.03 part of tetrabutoxytitanium were added thereto, and the temperature was elevated to 170° C. Sampling was carried out with the passage of time while maintaining this temperature to trace an amount of unreacted ε-caprolactone by measurement of an infrared absorption spectrum, and when the reaction rate reached 98% or more, the temperature was lowered down to 120° C. Next, added were 160 parts of diethanolamine and 65 parts of a methylisobutyldiketimine product of diethylenetriamine, and they were reacted at 120° C. for 4 hours. Then, 420 parts of ethylene glycol monobutyl ether was added thereto to obtain a cationic resin-2 solution having a resinous solid matter content of 80%. This resin had an amine value of 58 mg KOH/g.

PRODUCTION EXAMPLE 3

A reactor was charged with 1900 parts of "Epikote 1004" (brand name, manufactured by Japan Epoxy Resin Co., Ltd., bisphenol A type epoxy resin, epoxy equivalent: about 950) and 1012 parts of ethylene glycol monobutyl ether to dissolve them, and then 124 parts of diethylamine was dropwise added thereto while maintaining this solution at about 90° C. Then, the temperature was elevated up to 120° C., and the solution was maintained at the same temperature for 2 hours to obtain an amine-added epoxy resin having an amine value of about 47.

Next, 1000 parts of "Versamid 460" (brand name, manufactured by Henkel Japan Ltd., dimeric acid polyamide resin having an amine value of 100 mg KOH/g) was dissolved in 429 parts of methyl isobutyl ketone, and the solution was refluxed by heating at 130 to 150° C. to distil resulting water off, whereby a terminal amino group of the above amide resin was converted into ketimine. This was maintained at 150° C. for about 3 hours, and after distillation of water was stopped, it was cooled down to 60° C. Then, this product was added to the amine-added epoxy resin described above and heated to 100° C., and after maintained for one hour, it was cooled down to a room temperature to obtain a cationic resin-3 solution having a solid matter content of 68%. This resin had an amine value of 65 mg KOH/g.

Production of Blocked Polyisocyanate

PRODUCTION EXAMPLE 4

A reactor was charged with 270 parts of "Cosmonate M-200" (brand name, manufactured by Mitsui Takeda Chemicals, Inc., crude MDI) and 4 g of methyl isobutyl ketone and heated up to 70° C. Slowly added thereto was 15 parts of 2,2-dimethylolbutanoic acid, and they were reacted at 70° C. for one hour. Then, the solution was cooled down to 60° C., and 270 parts of propylene glycol was added. Sampling was carried out with the passage of time while maintaining this temperature to confirm by measurement of an infrared absorption spectrum that absorption of an unreacted isocyanato group disappeared to obtain a curing agent-1 solution having a solid matter content of 75%.

PRODUCTION EXAMPLE 5

A reactor was charged with 270 parts of "Cosmonate M-200" and 29 parts of methyl isobutyl ketone and heated up to 70° C. Slowly added thereto was 74 parts of 2,2-dimethylolbutanoic acid, and they were reacted at 70° C. for 2 hours. Then, the solution was cooled down to 60° C., and 152 parts of propylene glycol was added thereto. Sampling was carried out with the passage of time while maintaining this temperature to confirm by measurement of an infrared absorption spectrum that absorption of an unreacted isocyanato group disappeared to obtain a curing agent-2 solution having a solid matter content of 80%.

PRODUCTION EXAMPLE 6

A reactor was charged with 270 parts of "Cosmonate M-200" and 25 parts of methyl isobutyl ketone and heated up to 70° C. Slowly added thereto was 15 parts of 2,2-dimethylolbutanoic acid, and then 118 parts of ethylene glycol monobutyl ether was dropwise added to react them at 70° C. for one hour. Then, the solution was cooled down to 60° C., and 152 parts of propylene glycol was added thereto. Sampling was carried out with the passage of time while maintaining this temperature to confirm by measurement of an infrared absorption spectrum that absorption of an unreacted isocyanato group disappeared to obtain a curing agent-3 solution having a solid matter content of 80%.

PRODUCTION EXAMPLE 7

A reactor was charged with 250 parts of diphenylmethane-4,4'-diisocyanate and 25 parts of methyl isobutyl ketone and heated up to 70° C. Slowly added thereto was 15 parts of 2,2-dimethylolbutanoic acid, and then 118 parts of ethylene glycol monobutyl ether was dropwise added to react them at 70° C. for one hour. Then, the solution was cooled down to 60° C., and 188 parts of 1,4-pentanediol was added thereto. Sampling was carried out with the passage of time while maintaining this temperature to confirm by measurement of an infrared absorption spectrum that absorption of an unreacted isocyanato group disappeared to obtain a curing agent-4 solution having a solid matter content of 80%.

PRODUCTION EXAMPLE 8

A reactor was charged with 174 parts of tolylenediisocyanate and heated up to 70° C. Slowly added thereto was 15 parts of 2,2-dimethylolbutanoic acid, and then 118 parts of ethylene glycol monobutyl ether was dropwise added to react them at 70° C. for one hour. Then, the solution was cooled down to 60° C., and 152 parts of propylene glycol was added thereto. Sampling was carried out with the passage of time while maintaining this temperature to confirm by measurement of an infrared absorption spectrum that absorption of an unreacted isocyanato group disappeared to obtain a curing agent-5 solution having a solid matter content of 80%.

PRODUCTION EXAMPLE 9

Comparison

A reactor was charged with 152 parts of propylene glycol and 106 parts of methyl isobutyl ketone and heated up to 70° C. "Cosmonate M-200" 270 parts was dropwise added thereto in one hour. Sampling was carried out with the passage of time while maintaining this temperature to confirm by measurement of an infrared absorption spectrum that absorption of an unreacted isocyanato group disappeared to obtain a curing agent-6 solution having a solid matter content of 80%.

PRODUCTION EXAMPLE 10

Comparison

A reactor was charged with 222 parts of isophoronediisocyanate and 99 parts of methyl isobutyl ketone and heated up to 50° C. Slowly added thereto was 174 parts of methyl ethyl ketoxime, and then the temperature was elevated up to 60° C. Sampling was carried out with the passage of time while maintaining this temperature to confirm by measurement of an infrared absorption spectrum that absorption of an unreacted isocyanato group disappeared to obtain a curing agent-7 solution having a solid matter content of 80%.

PRODUCTION EXAMPLE 11

Comparison

A reactor was charged with 275 parts of "Cosmonate M-200" and 136 parts of methyl isobutyl ketone and heated up to 70° C. Slowly added thereto was 268 parts of diethylene glycol monoethyl ether, and then the temperature was elevated up to 90° C. Sampling was carried out with the passage of time while maintaining this temperature to confirm by measurement of an infrared absorption spectrum that absorption of an unreacted isocyanato group disappeared to obtain a curing agent-8 solution having a solid matter content of 80%.

Production of Clear Emulsion

PRODUCTION EXAMPLE 12

Blended were 87.5 parts (70 parts in terms of a resinous solid matter) of the cationic resin-1 of 80% obtained in Production Example 1 described above, 40 parts (30 parts in terms of a resinous solid matter) of the curing agent-1 solution having a solid matter content of 75% obtained in Production Example 4, 2.5 parts of 40% LSN-105 (brand name, manufactured by Sankyo Organic Chemicals Co., Ltd., dibutyltin dibenzoate, solid matter content: 40%) and 15 parts of 10% acetic acid, and they were stirred to homogeneity. Then, 153.5 parts of deionized water was dropwise added thereto in 15 minutes while strongly stirring to obtain a clear emulsion a for cationic electrodeposition having a solid matter content of 34%.

PRODUCTION EXAMPLES 13 TO 21

The same operation as in Production Example 12 was carried out to obtain the respective clear emulsions for cationic electrodeposition, except that in Production Example 11 described above, the composition was changed as shown in the following Table 1. The clear emulsions for cationic electrodeposition obtained in Production Example 19 to 21 are comparative.

Preparation of Cationically Electrodepositable Coating Material

EXAMPLE 1

Added to 297 parts of the clear emulsion a for cationic electrodeposition were 49.8 parts of the pigment-dispersed paste and 295.2 parts of deionized water, and they were stirred to homogeneity to obtain a cationically electrodepositable coating material having a solid matter content of 20%.

EXAMPLES 2 TO 7 AND COMPARATIVE EXAMPLES 1 TO 3

The same operation as in Example 1 was carried out to obtain the respective cationically electrodepositable coating materials having a solid matter content of 20%, except that the kind of the clear emulsion for cationic electrodeposition was changed as shown in Table 2 described later.

The respective cationically electrodepositable coating materials prepared in Examples 1 to 7 and Comparative Examples 1 to 3 had a good storage stability.

Coating Test

Cold rolled dull steel plates of 0.8×150×70 mm subjected to chemical conversion coating with Palbond #3020 (brand name, manufactured by Nihon Parkarizing Co., Ltd., zinc phosphate treating agent) were dipped in the respective cationically electrodepositable coating materials prepared in the examples and the comparative Examples each described above to carry out electrodeposition coating with these plates being used as cathodes so that a dried film thickness was about 20 μm. After finishing the electrodeposition coating, the plates were washed with water and then baked. An electric convection oven was used for baking. The tests of a corrosion resistance and a curing property were carried out at two stages of the ambient temperatures of 150° C. and 170° C., and a test of heat loss was carried out at an ambient temperature set to 70° C. The baking time was set to 20 minutes. The performance test results of the coated plates

TABLE 1

| | Production Example | | | | | | | | | |
|---|---|---|---|---|---|---|---|---|---|---|
| Kind of clear emulsion | 12<br>a | 13<br>b | 14<br>c | 15<br>d | 16<br>e | 17<br>f | 18<br>g | 19<br>h | 20<br>i | 21<br>j |
| Cationic resin-1 solution | 87.5 | 87.5 | 87.5 | 87.5 | 87.5 | | | 87.5 | 87.5 | 87.5 |
| Cationic resin-2 solution | | | | | | 87.5 | | | | |
| Cationic resin-3 solution | | | | | | | 102.9 | | | |
| Curing agent-1 solution | 40 | | | | | 40 | 40 | | | |
| Curing agent-2 solution | | 37.5 | | | | | | | | |
| Curing agent-3 solution | | | 37.5 | | | | | | | |
| Curing agent-4 solution | | | | 37.5 | | | | | | |
| Curing agent-5 solution | | | | | 37.5 | | | | | |
| Curing agent-6 solution | | | | | | | | 37.5 | | |
| Curing agent-7 solution | | | | | | | | | 37.5 | |
| Curing agent-8 solution | | | | | | | | | | 37.5 |
| 40% LSN-105 | 2.5 | 2.5 | 2.5 | 2.5 | 2.5 | 2.5 | 2.5 | 2.5 | 2.5 | 2.5 |
| 10% acetic acid aqueous solution | 15 | 15 | 15 | 15 | 15 | 15 | 15 | 15 | 15 | 15 |
| Deionized water | 153.5 | 156 | 156 | 156 | 156 | 153.5 | 138.1 | 156 | 156 | 156 |

Production of Pigment-Dispersed Paste

Added were 5.83 parts of a 60% quaternary ammonium salt-containing epoxy resin derivative, 14.5 parts of titanium white, 0.4 part of carbon black, 7.0 parts of an extender pigment, 2.0 parts of bismuth hydroxide and 22.4 parts of deionized water to obtain a pigment-dispersed paste having a solid matter content of 55.0%.

thus obtained are shown in Table 2 described later. The performance tests were carried out according to the following test methods.

Test Methods (*1) Heat loss: after electrodepositably coated and then washed with water, the plate was pre-heated at 105° C. for 3 hours and then baked and dried at 170° C. for 20 minutes to determine a heat loss of the coating film according to the following calculation equation:

weight of plate for coating (1)
weight of coated plate after pre-heated (2)
weight of coated plate after baked (3)

$$\text{heat loss (\% by weight)} = \frac{(2)-(3)}{(2)-(1)} \times 100$$

(*2) Curing property: the faces of the electrodepositably coated plates obtained at the respective baking temperatures were rubbed by 20 reciprocations in a length of about 3 to 4 cm at a pressure of 3.92 mPa (about 4 kgf/cm$^2$) with a set of four gauzes soaked with acetone to visually evaluate the appearance of the coated face according to the following criteria:
○: no scratches are observed on the coated face
Δ: scratches are observed on the coated face, but the base was not exposed
X: coating film is dissolved, and base is exposed
(*3) Corrosion resistance: crosscut scratches were provided on the faces of the electrodepositably coated plates obtained at the respective baking temperatures by means of a knife so that it reached the base material, and the plates were subjected to a brine spraying resistance test for 840 hours according to JIS Z-2371 to evaluate a width of rust and blister originating from the knife scratches according to the following criteria:
○: maximum width of rust and blister is less than 2 mm (one side) from the cut part
Δ: maximum width of rust and blister is 2 mm or more and less than 3 mm (one side) from the cut part, and blisters are pretty markedly observed on the plane part
X: maximum width of rust and blister is 3 mm or more (one side) from the cut part, and blisters are observed on the whole coated face

TABLE 2

| | | Example | | | | | | | Comparative Example | | |
|---|---|---|---|---|---|---|---|---|---|---|---|
| | | 1 | 2 | 3 | 4 | 5 | 6 | 7 | 1 | 2 | 3 |
| Clear emulsion | Kind | a | b | c | d | e | f | g | h | i | j |
| | Amount | 297 | 297 | 297 | 297 | 297 | 297 | 297 | 297 | 297 | 297 |
| Pigment-dispersed paste | | 49.8 | 49.8 | 49.8 | 49.8 | 49.8 | 49.8 | 49.8 | 49.8 | 49.8 | 49.8 |
| Deionized water | | 295.2 | 295.2 | 295.2 | 295.2 | 295.2 | 295.2 | 295.2 | 295.2 | 295.2 | 295.2 |
| Test results | Heat loss 170° C. | 8.7 | 6.7 | 10.5 | 10.8 | 12.5 | 8.9 | 4.2 | 10.5 | 12.5 | 15.2 |
| | Curing property 140° C. | ○ | ○ | ○ | ○ | ○ | ○ | ○ | X | ○ | X |
| | 150° C. | ○ | ○ | ○ | ○ | ○ | ○ | ○ | Δ | ○ | X |
| | 170° C. | ○ | ○ | ○ | ○ | ○ | ○ | ○ | ○ | ○ | ○ |
| | Corrosion resistance 150° C. | ○ | ○ | ○ | ○ | ○ | ○ | ○ | X | X | X |
| | 170° C. | ○ | ○ | ○ | ○ | ○ | ○ | ○ | ○ | X | ○ |

As described above, according to the present invention, the diol (a) of a low molecular weight which has two hydroxyl groups having different reactivities from each other and the carboxyl group-containing diol (b) are used in combination as a blocking agent in blocked polyisocyanate used as a cross-linking agent in the cationic resin composition, whereby capable of being obtained is the cationic coating material which has a good coating material stability and corrosion resistance and which is excellent in a low heat loss and a curing property at a low temperature. Further, the cationic coating material has a low heat loss and therefore can reduce production of tar and soot in a drying oven of a baking coating line.

What is claimed is:
1. A cationic resin composition comprising:
(A) a cationic resin and
(B) a blocked polyisocyanate obtained by reacting an active hydrogen-containing component which is composed of a diol (a) which has two hydroxyl groups having different reactivities from each other and which has a molecular weight of 76 to 150 and a carboxyl group containing diol (b) having a molecular weight of 106 to 500, or which is composed of the diol (a), the carboxyl group containing diol (b) and another blocking agent (d), with a polyisocyanate compound (c),
wherein the diol (a) is in such an amount that hydroxyl group contained in the diol (a) accounts for 0.6 to 6 equivalent per equivalent of isocyanate group of the polyisocyanate compound (c); the carboxyl group containing diol (b) is in such an amount that hydroxyl group contained in the carboxyl group-containing diol (b) accounts for 0.005 to 0.6 equivalent; the total equivalent of the hydroxyl groups contained in the diol (a) and the carboxyl group-containing diol (b) per equivalent of isocyanate group of the polyisocyanate compound (c) is 0.65 equivalent or more; and the total equivalent of the whole active hydrogens contained in the active hydrogen-containing component is 1.2 to 6.1 equivalent.
2. The resin composition as described in claim 1, wherein the cationic resin (A) is an amine-added epoxy resin.
3. The resin composition as described in claim 2, wherein the amine-added epoxy resin is a polyol-modified amine-added epoxy resin obtained by reacting a polyepoxide compound having an epoxy equivalent of 180 to 2500 with a polyol compound obtained by adding caprolactone to a compound having two or more active hydrogen groups in a molecule and an amino group-containing compound.
4. The resin composition as described in claim 1, wherein the polyisocyanate compound (c) is an aromatic polyisocyanate compound.
5. The resin composition as described in claim 4, wherein the polyisocyanate compound (c) is at least one compound selected from diphenylmethane-4,4'-diisocyanate and diphenylmethane-2,4'-diisocyanate and crude MDI.
6. The resin composition as described in claim 1, wherein the diol (a) has two hydroxyl groups of a combination of a primary hydroxyl group and a secondary hydroxyl group, a primary hydroxyl group and a tertiary hydroxyl group and a secondary hydroxyl group and a tertiary hydroxyl group.
7. The resin composition as described in claim 1, wherein the diol (a) is selected from the group consisting of propylene glycol, dipropylene glycol, 1,3-butanediol, 1,2-butanediol, 3-methyl-1,2-butanediol, 1,2-pentanediol, 1,4- pentanediol, 3-methyl-4,3-pentanediol, 3-methyl-4,5-pentanediol, 2,2,4-trimethyl-1,3-pentanediol, 1,5-hexanediol and 1,4-hexanediol.

8. The resin composition as described in claim 1, wherein the diol (a) is propylene glycol.

9. The resin composition as described in claim 1, wherein the carboxyl group-containing diol (b) is selected from the group consisting of 2,2-dimethylolpropionic acid, 2,2-dimethylolbutanoic acid, dimethylolvaleric acid and glyceric acid.

10. The resin composition as described in claim 1, wherein the carboxyl group-containing diol (b) is 2,2-dimethylolbutanoic acid.

11. The resin composition as described in claim 1, wherein the other blocking agent (d) is selected from the group consisting of a lactam compound, an ether alcohol base compound and a low molecular weight amide compound.

12. The resin composition as described in claim 1, wherein the blocked polyisocyanate (B) is obtained by reacting the polyisocyanate compound (c) with the active hydrogen-containing component comprising the diol (a) in such an amount that a hydroxyl group contained in the diol (a) accounts for 0.6 to 6 equivalent per equivalent of an isocyanato group of the polyisocyanate compound (c), the carboxyl group-containing diol (b) in such an amount that a hydroxyl group contained in the carboxyl group-containing diol (b) accounts for 0.005 to 0.6 equivalent and, if necessary, the other blocking agent (d); the total equivalent of the hydroxyl groups contained in the diol (a) and the carboxyl group-containing diol (b) per equivalent of an isocyanato group of the polyisocyanate compound (c) is 0.65 equivalent or more; and the total equivalent of the whole active hydrogens contained in the active hydrogen-containing component is 1.2 to 6.1 equivalent.

13. The resin composition as described in claim 1, wherein a blending proportion of the diol (a), the carboxyl group-containing diol (b) and the other blocking agent (d) in the active hydrogen-containing component falls in a range of 10 to 95 mole % in the case of the diol (a), 0.5 to 50 mole % in the case of the carboxyl group-containing diol (b) and 0 to 65 mole % in the case of the other blocking agent (d) each based on the total amount of these three compounds.

14. The resin composition as described in claim 1, wherein the blocked polyisocyanate (B) is obtained by reacting the polyisocyanate compound (c) with the carboxyl group-containing diol (b) and, if necessary, the other blocking agent (d) and then reacting with the diol (a).

15. The resin composition as described in claim 1, further comprising an organotin compound as a curing catalyst.

16. The resin composition as described in claim 1, wherein the cationic resin (A) is neutralized with an acid and dissolved or dispersed in a water based medium, and it is cationically electrodepositable.

17. A cross-linking agent comprising a blocked polyisocyanate obtained by reacting an active hydrogen-containing component comprising a diol (a) which has two hydroxyl groups having different reactivities from each other and which has a molecular weight of 76 to 150 and a carboxyl group-containing diol (b) having a molecular weight of 106 to 500 with a polyisocyanate compound (c).

18. A cationically electrodepositable coating method characterized by using the cationic resin composition as described in claim 16.

19. An article coated with the cationic resin composition as described in claim 1.

* * * * *